United States Patent [19]

Konkle et al.

[11] 4,190,140
[45] Feb. 26, 1980

[54] FLUID COUPLING DEVICE, BIMETAL CLIP AND METHOD OF ASSEMBLY THEREFOR

[75] Inventors: Phillip E. Konkle, Albion; Thomas H. Tinholt, Marshall, both of Mich.

[73] Assignee: Eaton Corporation, Cleveland, Ohio

[21] Appl. No.: 909,755

[22] Filed: May 26, 1978

[51] Int. Cl.² .................. F16D 43/25; F16D 35/00
[52] U.S. Cl. .................. 192/82 T; 29/156.8 FC; 29/157.1 R; 29/172; 73/363.9; 192/58 B; 236/101 D
[58] Field of Search .................. 192/58 B, 82 T; 29/156.8 FC, 157.1 R, 172; 73/363.9; 236/101 D

[56] References Cited

U.S. PATENT DOCUMENTS

| | | | |
|---|---|---|---|
| 2,609,690 | 9/1952 | Osborne et al. | 73/363.9 |
| 3,055,473 | 9/1962 | Oldberg et al. | 192/58 B |
| 3,227,254 | 1/1966 | Sutaruk | 192/58 B |
| 3,263,783 | 8/1966 | Sutaruk | 192/58 B |
| 3,559,786 | 2/1971 | Long, Jr. | 192/82 T X |
| 4,054,193 | 10/1977 | Streeter | 192/82 T X |
| 4,103,765 | 8/1978 | Tinholt | 192/82 T |
| 4,116,316 | 9/1978 | Streeter | 192/82 T X |

Primary Examiner—Allan D. Herrmann
Attorney, Agent, or Firm—R. J. McCloskey; J. Yakimow; L. Kasper

[57] ABSTRACT

A fluid coupling device is disclosed of the type including a valve member actuated by a valve shaft extending through the cover, the position of the valve and valve shaft being controlled by a temperature responsive bimetal coil. The coil has a first end attached to the valve shaft and a second end received within a clip member to prevent circumferential movement of the second end of the coil. The clip member includes wing portions which are generally parallel to the adjacent surface of the cover. After the clip and the bimetal coil are assembled, the coil is permitted to achieve its neutral position in both the radial and circumferential direction, and subsequently, each of the wing portions is attached to the adjacent portion of the cover without causing substantial radial or circumferential movement of the second end of the coil. As a result, the coil is able to withstand extreme vibration conditions, but is not subject to the high hysteresis which normally occurs with a rigid mounting of the coil.

8 Claims, 14 Drawing Figures

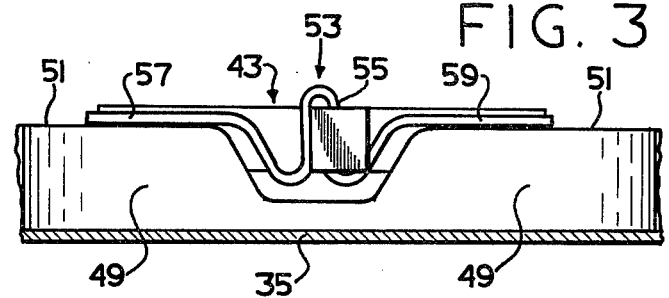
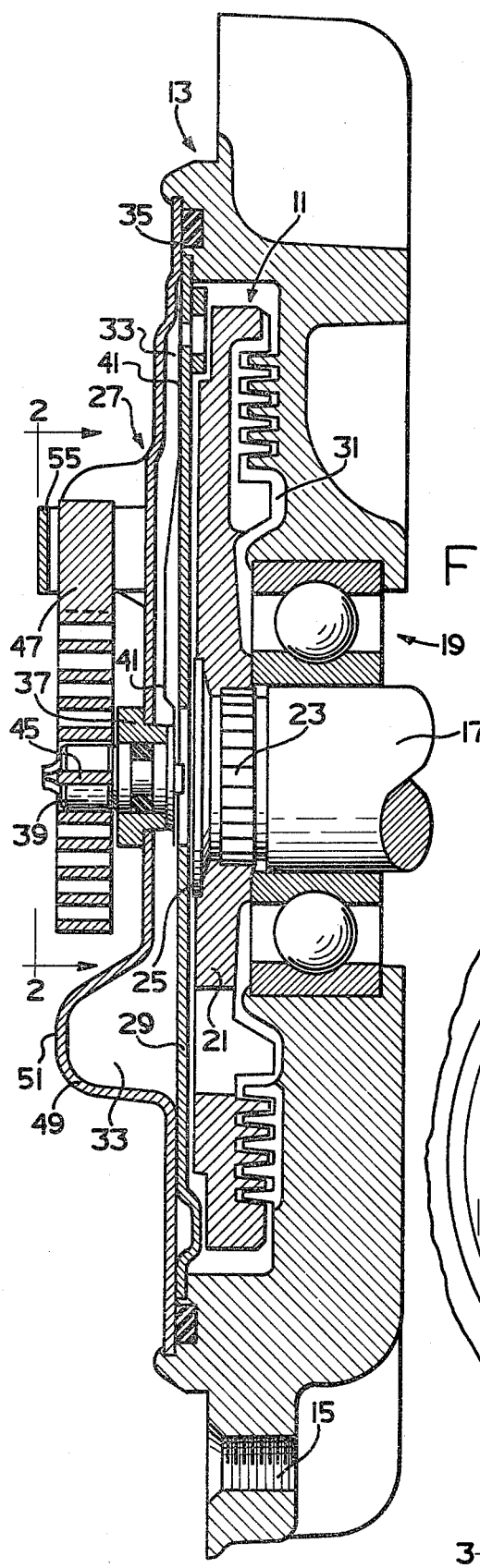
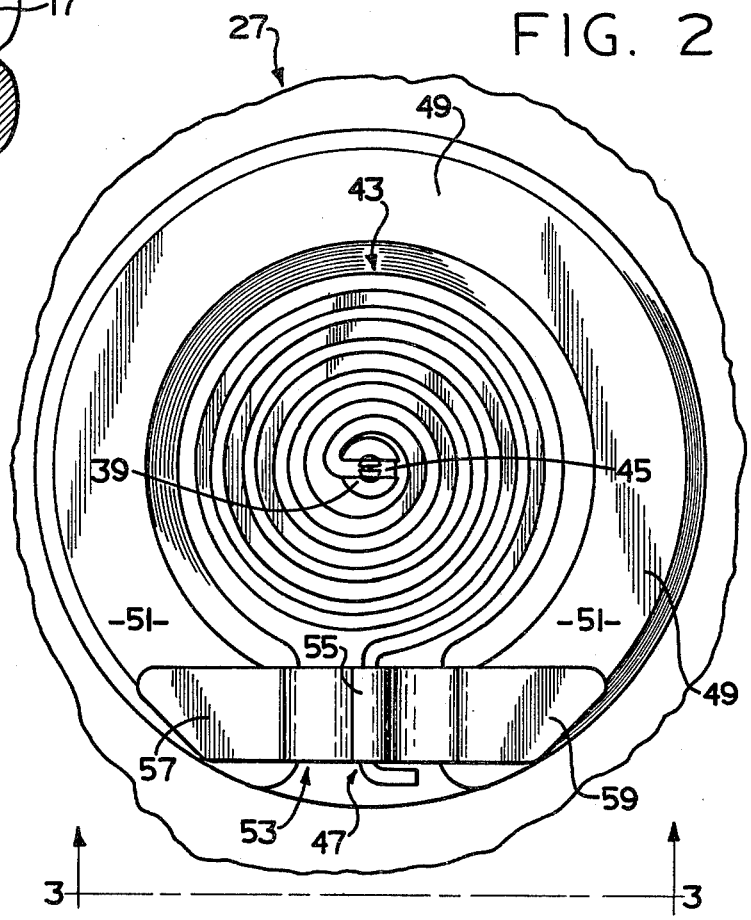

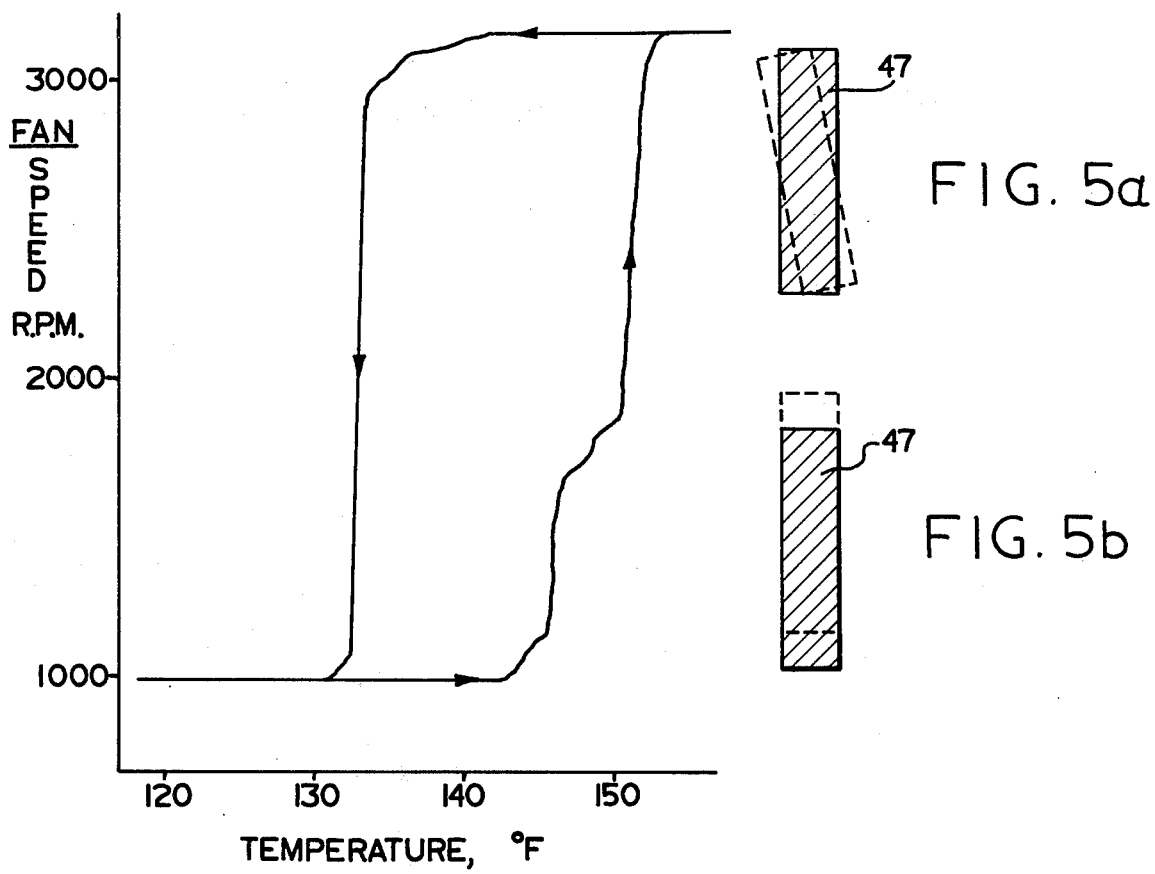
FIG. 4
FIG. 5a
FIG. 5b
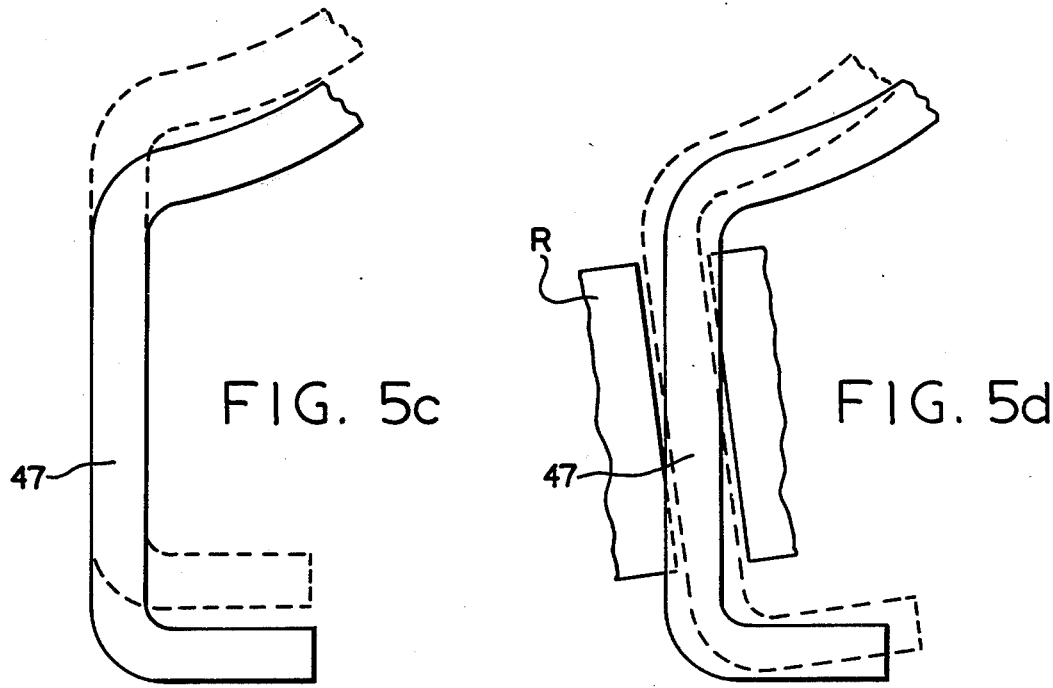
FIG. 5c
FIG. 5d

FLUID COUPLING DEVICE, BIMETAL CLIP AND METHOD OF ASSEMBLY THEREFOR

BACKGROUND OF THE DISCLOSURE

The present invention relates to fluid coupling devices of the type including temperature responsive bimetal elements, and more particularly, to a clip member for mounting the free end of the element, and the associated method of assembly.

Fluid coupling devices of the type to which the present invention relates are now well-known in the art and may be better understood by reference to U.S. Pat. No. 3,055,473, assigned to the assignee of the present invention. Although the present invention may be useful with many types and configurations of temperature responsive fluid couplings, it is especially advantageous on those to be used with vehicle radiator cooling fans, and will be described in connection therewith.

A typical fluid coupling device includes an output coupling member and a cover member cooperating to define a fluid chamber. The device includes a valve plate disposed to separate the fluid chamber into a reservoir and an operating chamber. An input coupling member is rotatably disposed within the operating chamber and the device includes valve means operable to control the flow of fluid between the reservoir and the operating chamber. The valve means includes a valve shaft extending outwardly through the cover means and being rotatable relative thereto. The rotational position of the valve shaft and the valve is controlled by a temperature responsive bimetal element having a first end portion connected to the valve shaft and a second end portion fixed relation to the cover means.

As is well-known to those skilled in the art, one of the primary reasons for using a viscous fluid coupling to drive a radiator cooling fan, rather than the conventional direct drive, is to save engine horsepower. This is accomplished by the fluid coupling becoming "disengaged" when operation of the fan is not needed for cooling of the engine. Accordingly, viscous fluid couplings have been used for many years on the larger six-cylinder and eight-cylinder engines (truck and automotive), where the potential horsepower savings are greatest. More recently, the desire to minimize wasted power on all engines has led to the use of viscous fluid couplings even on four-cylinder engines.

A problem which has arisen in connection with the use of viscous fluid couplings on four-cylinder engines relates to the greater vibration inherent in four-cylinder engines. The engine vibration is transmitted to the fluid coupling and typically, the result is excessive wear between the bimetal element and the shaft and between the bimetal element and its mounting bracket. If excessive wear occurs at either of these locations, there may be a substantial change in the temperature at which the coupling engages and/or disengages, causing unsatisfactory operation of the device.

If the wear becomes really excessive, especially between the bimetal coil and the shaft, the coil may become completely detached from the device, with the result that the device will no longer be temperature responsive, but will remain either engaged or disengaged, whichever was the condition of the device at the time that the coil became detached.

The apparently obvious solution to the above-described problem would seem to be to provide a more rigid mounting of the free end of the coil, relative to the cover of the coupling. However, it was found during the development leading to the present invention that gripping the free end of the coil rigidly enough to prevent the coil from being vibrated loose would generally result in the coil being fractured adjacent the point at which it was being rigidly gripped.

Even before breakage of the coil would occur, it was found that any of the obvious methods of rigidly mounting the free end of the coil would adversely affect the performance of the device by inducing high hysteresis. Hysteresis will be described in greater detail subsequently, but briefly, it occurs when improper location or alignment of the coil, shaft, or valve results in frictional drag on the shaft or valve. This drag causes the device to remain engaged until the temperature is substantially below the engagement temperature, wasting engine horsepower and resulting in excessive noise of operation.

SUMMARY OF THE INVENTION

Accordingly, it is an object of the present invention to provide a temperature responsive fluid coupling device in which the free end of the bimetal element is mounted rigidly relative to the cover, without causing breakage of the bimetal element or inducing hysteresis.

It is a related object of the present invention to provide a simple, inexpensive mounting clip and method of assembly which achieves the above-stated objects.

The above and other objects of the invention are accomplished by the provision of an improved mounting arrangement of the bimetal element. The improvement comprises a clip member including a portion receiving the free end of the bimetal element and first and second wing portions oppositely disposed about the receiving portion and oriented generally parallel to the adjacent surface portion of the cover. Means are provided for attaching each of the wing portions to the adjacent portion of the cover. The receiving portion of the clip member is configured to substantially prevent circumferential movement of the free end of the element relative to the axis of rotation. Either the clip member or the free end of the bimetal element includes means for restraining radial movement of the free end of the bimetal element, relative to the clip member.

In accordance with another aspect of the present invention, there is provided an improved method of assembling the cover subassembly of the device. The method comprises assembling the valve shaft and the cover member, assembling the first end of the bimetal coil and the valve shaft, and assembling the clip member and the bimetal coil with the free end disposed within the receiving portion of the clip member. Subsequently, the free end of the bimetal coil is permitted to achieve its neutral position in both the radial and the circumferential directions, then the first and second wing portions are fixedly attached to the adjacent surface of the cover without permitting substantial radial or circumferential movement of the free end of the coil during the attaching step.

BRIEF DESCRIPTION OF THE DRAWINGS

FIG. 1 is an axial cross section of a typical fluid coupling device utilizing the present invention.

FIG. 2 is a fragmentary plan view taken on line 2—2 of FIG. 1.

FIG. 3 is a fragmentary, transverse cross section, of the cover subassembly only, taken on line 3—3 of FIG. 2.

FIG. 4 is a graph of fan speed vs. temperature, illustrating the effects of hysteresis.

FIGS. 5a through 5d are schematic representations, exaggerated for ease of illustration, of some of the causes of hysteresis.

DESCRIPTION OF THE PREFERRED EMBODIMENT

Figure 6:
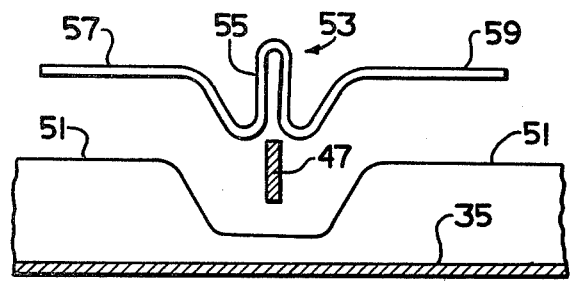
FIGS. 6, 7, and 8 are somewhat schematic illustrations of the assembly method of the present invention.

Referring now to the drawings, which are not intended to limit the invention, FIG. 1 illustrates a preferred form of a fluid coupling device with which the present invention may be utilized. The fluid coupling device includes an input coupling member 11 and an output coupling member 13. The fluid coupling of the subject embodiment may be used as a drive for an automotive engine accessory, and specifically, as a drive for a radiator cooling fan. The fan (not shown) may be bolted to the output coupling member 13 by means of a plurality of threaded bores 15 formed in the member 13. It will be understood, however, that the use of the present invention is not limited to any particular fluid coupling configuration or application.

The fluid coupling includes an input shaft 17 on which input member 11 is mounted and which is rotatably driven, typically by means of a flange (not shown) which may be bolted to the flange of the water pump (not shown). The input shaft 17 functions as a support for the inner race of a bearing set 19, which is seated on the inside diameter of the output coupling member 13.

The input coupling member 11 is in the form of a disc having a hub portion 21 supported by the forward end of the shaft 17. The hub portion 21 has an opening therethrough which has an interference fit with a serrated portion 23 of the shaft 17. The hub portion 21 is pressed onto the serrated portion 23 until it abuts the side of the inner race of the bearing set 19, and the output end (left end in FIG. 1) of the shaft 17 has a retaining portion 25, to positively retain the input coupling member 11 on the shaft 17, such that rotation of the shaft 17 causes rotation of the input coupling member 11.

The output coupling member 13 cooperates with a cover assembly, generally designated 27, to define a fluid chamber therebetween, the fluid chamber being separated by a valve plate 29 into a fluid operating chamber 31 and a fluid reservoir chamber 33.

Included within the cover assembly 27 is a stamped cover member 35 defining a central aperture which receives a generally cylindrical insert member 37. Rotatably disposed within the insert member 37, and supported thereby, is a valve shaft 39, extending "outwardly" (to the left in FIG. 1) through the cover member 35. Attached to the inner end (right end in FIG. 1) of the valve shaft 39 is a valve arm 41, the general construction and operation of which may be better understood by reference to U.S. Pat. No. 3,055,473.

Referring now to FIGS. 2 and 3, in conjunction with FIG. 1, it may be seen that the cover assembly 27 includes a bimetal element, generally designated 43 which, in the subject embodiment, is formed in the shape of a helical coil. The bimetal coil 43 includes a first end portion 45, received within a slot formed in the outer end of the valve shaft 39. The bimetal coil 43 also includes a second end portion, generally designated 47. The cover member 35 includes a raised, generally annular reservoir portion 49, including a flat surface portion 51 oriented generally perpendicular to the axis of rotation of the fluid coupling device. The raised reservoir portion 49 has a circumferential extent which is almost a full circle, with the exception of the "valley" in which the second end portion 47 of the bimetal coil 43 is located. It should become apparent, upon a reading of the remainder of the specification, that the configuration of the cover member 35 does not form an essential part of the present invention.

It is a feature of the present invention that the cover assembly 27 includes a clip member, generally designated 53, the function of which is to maintain the second end portion 47 of the bimetal coil 43 substantially fixed relative to the cover member 35. As used herein, the term "substantially fixed" should be understood to mean that the second end portion 47 is held sufficiently rigidly to prevent the type of destructive wear and movement discussed previously in connection with the prior art.

As may best be seen by viewing FIG. 6, in conjunction with FIGS. 1 through 3, the clip member 53 includes a downwardly-opening, generally U-shaped portion 55, which is adapted to receive the end portion 47 of the coil 43, and grippingly engage the side surfaces thereof.

The clip member 53 further includes a pair of wing portions 57 and 59, which are oppositely disposed about the U-shaped receiving portion 55. In the subject embodiment, each of the wing portions 57 and 59 is substantially planar, and is oriented generally paralled to the upper, flat surface 51 of the cover member 35. Accordingly, the under surfaces of the wing portions 57 and 59 engage the flat surface 51, and are fixedly attached thereto by any of several suitable means, one of which will be described subsequently, in connection with the description of the assembly method and FIGS. 6-8.

Referring now to FIGS. 4 and 5a-5d, the problem of hysteresis, referred to briefly in the background of the specification, will be discussed in greater detail. FIG. 4 is a graph of fan speed versus temperature for a typical fluid coupling device in which some hysteresis occures. In an ideal theoretical coupling device, there would be no frictional drag between the valve shaft 39 and insert 37, or between the valve arm 41 and the valve plate 29. The result in such an ideal device would be a graph of fan speed versus temperature in which the line representing engagement (rising fan speed), would coincide very nearly with the line representing disengagement (fan speed decreasing).

However, as may be seen in the graph of FIG. 4, a typical coupling device will engage at one temperature, but will not disengage until the temperature drops substantially below the temperature at which engagement occurs. The difference between the engagement temperature and the disengagement temperature is the quantity known as hysteresis. It may be seen that in the sample graph of FIG. 4, the hysteresis is about 18 degrees F. (151 degrees–133 degrees). It will be apparent to those skilled in the art that it is desirable to maintain hysteresis at a predetermined minimum (e.g., 5–10 degrees F., to prevent instability), because, as the amount of hysteresis increases, the coupling device remains in the engaged condition longer, continuing to operate at a temperature below that at which cooling is necessary, thereby wasting engine horsepower and causing excessive noise.

Referring now to FIGS. 5a–5d, there will be described some of the ways in which hysteresis is typically induced as a result of attempting to rigidly fix the second end portion 47 of the bimetal coil 43. In each of the figures, the solid line view of the second end portion 47 illustrates the desired position and orientation of the portion 47, with the dotted line view illustrating a particular way in which the end portion 47 may be improperly positioned or located. Each of the figures indicates a particular type of improper positioning, in one direction only, and it should be apparent that in each case, the same type of mislocation in the opposite direction would have similar, but opposite, effects on the orientation of the valve shaft 39 and valve arm 41. It should also be appreciated that the mislocation illustrated by the dotted line view is exaggerated for ease of illustration. FIGS. 5a and 5b are transverse cross sections through end portion 47, looking toward the axis of the coupling, and FIGS. 5c and 5d are top plan views of end portion 47.

The twisting of the end portion 47, as shown in FIG. 5a, urges the valve shaft 39 toward a position in which its axis would be oriented at an angle relative to the axis of the coupling. However, even if the valve shaft 39 does not actually become misaligned within the insert 37, a substantial increase in the frictional drag between the shaft 39 and insert 37 occurs. The condition illustrated in FIG. 5b in which the end portion 47 is raised (or lowered), has substantially the same effect on the relationship of the valve shaft 39 and insert 37 as does the condition illustrated in FIG. 5a, but at a 90° angle thereto. In either case, it should be noted that if the clearance between the shaft 39 and insert 37 is sufficient to actually allow angular movement of the axis of the shaft 39, there is an effect on the frictional engagement between the valve arm 41 and the valve plate 29, depending upon the angular relationship between the valve arm 41 and the misalignment of the shaft axis.

FIG. 5c indicates a condition in which the end portion 47 is moved radially closer to (or further from) the axis of the coupling. The result is a side-load imposed on the valve shaft 39 in the direction of the radial misalignment of end portion 47 causing increased frictional drag between the opposite side of the valve shaft 39 and the insert 37.

FIG. 5d illustrates a condition in which the end portion 47 is twisted from its perfectly radial orientation, with the result again being a side-load on the valve shaft 39, but acting in a direction at right angles to the side-load imposed in FIG. 5c. Shown in solid lines in FIG. 5d is a fragmentary view of a rigid retainer R, of the type which would cause such twisting.

Figure 7:
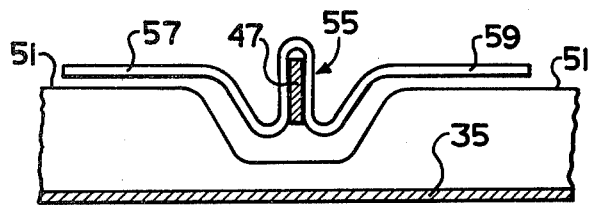
Figure 8:
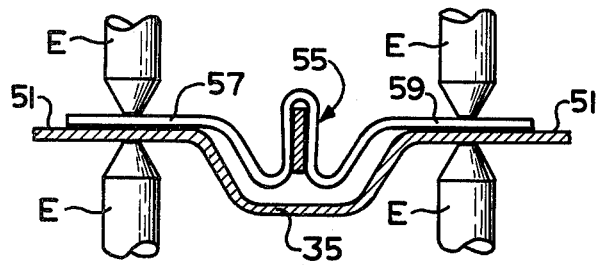

Referring now to FIGS. 6–8, the method of assembling the fluid coupling device of the present invention will be described in some detail. As is well known to those skilled in the fluid coupling art, the device shown in FIG. 1 may be considered as comprising two subassemblies, one being the coupling member subassembly, and the other being the cover subassembly. It should be understood that the assembly method of the present invention relates only to the cover subassembly, and not to the subassembly of the coupling members. Conventionally, the subassembly of the coupling members is accomplished by first pressing the bearing set 19 into the output coupling member 13, positioning the shaft 17 within the inner race of the bearing set 19, pressing the input member 11 onto the serrated portion 23, then rolling the retaining portion 25 to retain the input member 11. This completes the coupling member subassembly.

Assembling the cover subassembly involves welding the insert 37 to the cover member 35, attaching the valve arm 41 to the inner end of the valve shaft 39, then positioning the shaft 39 within the insert 37. Subsequently, the first end portion 45 of the bimetal coil 43 is put into the slot of the shaft 39 and the clip member 53 is mounted on the second end portion 47 of the coil 43. It should be understood that within the scope of the invention, the mounting of the clip 53 on the coil may occur before or after the assembly of the coil and the shaft 39.

Referring again to FIGS. 6–8, there is illustrated the embodiment of the assembly method in which the coil 43 is assembled to the shaft 39 prior to the mounting of the clip 53 on the coil. The clip 53 is mounted on the coil by placing the U-shaped portion 55 over the end portion 47 (the position shown in FIG. 7). After the clip 53 is mounted on the end portion 47, it is an essential feature of the method of the invention that the end portion 47 be permitted to achieve a "neutral" position in both the radial and circumferential directions. As used herein, the term "neutral," in reference to the position of the end portion 47 of the coil, means the unrestrained position of the end portion 47, in which the conditions illustrated in FIGS. 5c and 5d are not induced.

It should be appreciated that in regard to the neutral position illustrated in FIG. 7, the clearance between the surface portion 51 and the wing portions 57 and 59 has been exaggerated for ease of illustration. Preferably, the dimensional relationships of the various parts will be such that the clearance will be measured in thousandths of an inch.

With the end portion 47 in its neutral position as shown in FIG. 7, the next step is to attach each of the wing portions 57 and 59 to the adjacent surface portion 51 without permitting or causing any substantial movement of the end portion 47 and clip 53, in either the radial or circumferential directions. Although the method of the present invention is not limited to any particular method of attaching, FIG. 8 illustrates somewhat schematically a preferred embodiment in which a pair of welding electrodes E are brought into position to weld each of the wing portions 57 and 59 to the adjacent surface portion 51. It will be appreciated that, preferably, the two lower electrodes E should engage the cover member 35 at substantially the same time, and the two upper electrodes E should contact the wing portions 57 and 59 at substantially the same time in order that the end portion 47 and the clip 53 are in substantially the same position (in the radial and circumferential directions) after the welding step as before the welding step, to minimize the amount of mislocation of the end portion 47 induced by the welding step. Although FIGS. 6–8 illustrate the assembly method being performed with the cover oriented horizontally, and the coil above the cover, it is within the scope of the invention to orient the cover subassembly in any manner which facilitates the method. For example, the clip member could be positioned "upside-down" in a welding fixture and the cover and coil subassembly also placed in the fixture upside-down, effecting assembly of the clip and coil at the same time, then immediately welding the clip to the cover.

It should be apparent to those skilled in the art that the mounting clip and assembly method of the invention will greatly improve the hysteresis-causing conditions illustrated in FIGS. 5c and 5d, but may not improve those shown in FIGS. 5a and 5b. However, in the event that minimizing hysteresis is extremely critical, it would be possible to improve the conditions shown in FIGS. 5a and 5b by placing thin shims between the surface portion 51 and the underside of the wing portions 57 and 59 to substantially eliminate any downward movement of the end portion 47 which may be caused by the downward movement of the upper electrodes E during the welding process. Shimming before welding could also be useful in the event that inaccuracies in the stamping of either the clip 53 or the cover member 35 result in substantially different clearances between the surface portion 51 and the wing portions 57 and 59, with the coil in its neutral position. It would be necessary in such a situation to weigh the benefits of absolute minimum hysteresis against the added manufacturing cost of the shimming step.

It is also believed obvious to those skilled in the art to try clip members having configurations slightly different from that shown, and made from various materials, differing in characteristics such as resiliency. It has been found during the development of the present invention that some degree of resiliency is desired, because an absolutely rigid clamping of the end portion 47 typically results in breakage of the coil adjacent the claiming point, as was discussed previously.

Figure 11:
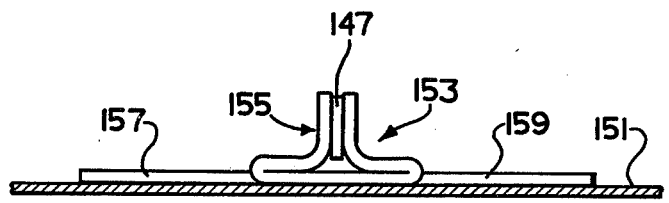
FIG. 11 is a fragmentary, transverse cross section, taken on line 11—11 of FIG. 10.
Figure 9:
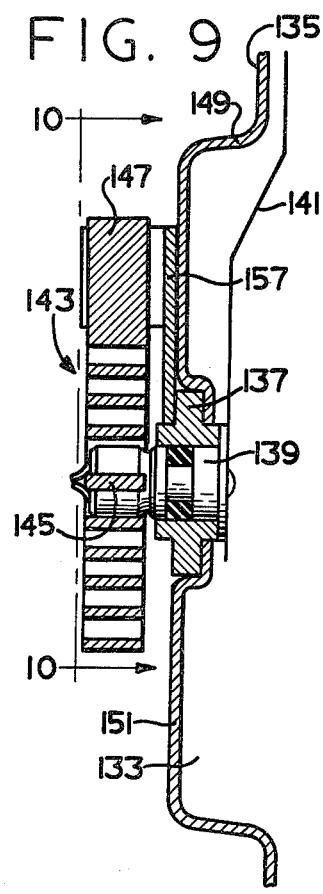
FIG. 9 is a fragmentary, axial cross section similar to FIG. 1, illustrating an alternative embodiment of the present invention.
Figure 10:
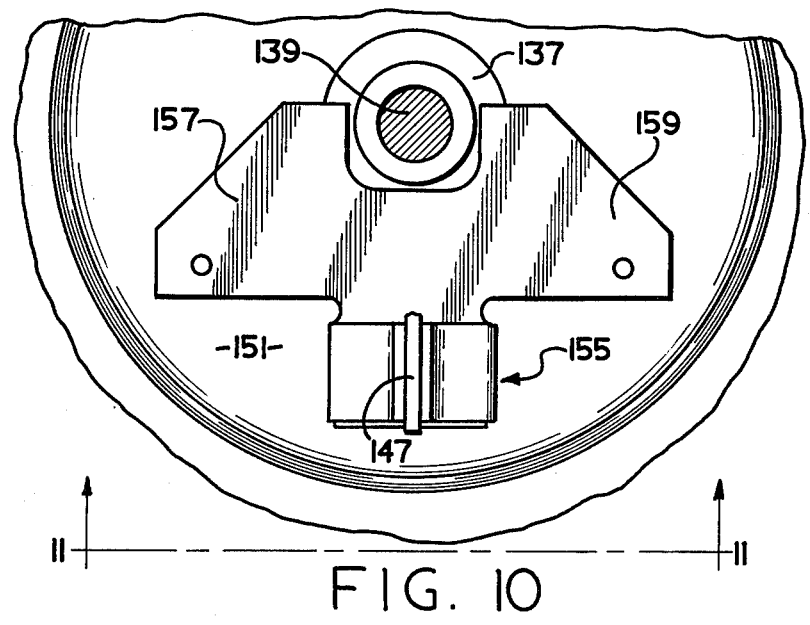
FIG. 10 is a plan view taken on line 10—10 of FIG. 9, with most of the bimetal coil and shaft removed.

As an example of the possibility of various alternative clip configurations, FIGS. 9, 10, and 11 illustrate one such alternative embodiment, by way of example only, with like elements bearing like reference numerals, plus 100. It should first be noted that in the embodiment of FIGS. 9-11, the cover member 135 does not define the type of raised, annular reservoir, surrounding the coil and clip, as in the FIG. 1 embodiment. Instead, the cover member 135 includes a raised, circular reservoir portion 149, including a flat, circular surface portion 151. The clip member 153 includes an upwardly-opening, generally T-shaped portion 155, which is adapted to receive the end portion 147 of the coil 143, and grippingly engage the side surfaces thereof.

The T-shaped portion 155 is formed integrally with a flat portion, including a pair of wing portions 157 and 159, which are shown partially surrounding the valve shaft 139. In this embodiment, the wing portion 157 and 159 are substantially planar, and are oriented generally parallel to the upper flat surface portion 151 such that the under surfaces of the wing portion 157 and 159 engage the surface 151 and are fixedly attached thereto. It should be understood in connection with the alternative embodiment that the method of assembly may be substantially identical to the method described in connection with FIGS. 6, 7, and 8.

It should be noted that, because of the configuration of the U-shaped portion 55, the preferred embodiment of FIGS. 1-3 is more "tamper-proof" than the embodiment of FIGS. 9-11, wherein the end portion 147 may be removed from engagement with the T-shaped portion 155. However, from a reading and understanding of the present specification, it would be obvious to those skilled in the art to configure the clip member to take advantage of the assembly method of the invention, and conform the clip to the shape of the cover member as do the embodiments shown herein, while being relatively tamper-proof, if desired.

What is claimed is:

1. In a fluid coupling device of the type including a first rotatable member defining an axis of rotation, cover means associated with the first member to define a fluid chamber therebetween, a valve plate disposed to separate the fluid chamber into a fluid operating chamber and a fluid reservoir chamber, a second rotatable member disposed in the fluid operating chamber and rotatable relative to the first member, valve means operable to control fluid communication between the operating chamber and the reservoir chamber and including a valve shaft disposed generally axially and extending outwardly through the cover means and being rotatable relative thereto, a bimetal element having a first end portion operatively connected to the valve shaft and a second end portion, the improvement comprising:
   (a) a clip member including a portion receiving the second end portion of the bimetal element and first and second wing portions oppositely disposed about said receiving portion and oriented generally parallel to the adjacent surface portion of the cover means;
   (b) means for attaching each of said first and second wing portions to said adjacent portion of the cover means;
   (c) said receiving portion of the clip member being configured to substantially prevent circumferential movement of said second end portion relative to the axis of rotation; and
   (d) one of said clip member and the second end portion of the bimetal coil including means for restraining radial movement of the second end portion of the bimetal coil relative to said clip member.

2. The fluid coupling device of claim 1 wherein said bimetal element comprises a helical coil member.

3. The fluid coupling device of claim 1 wherein said receiving portion is generally U-shaped and opens in a direction toward said cover means.

4. The fluid coupling device of claim 3 wherein said radial restraining means comprises frictional engagement between said second end portion and said U-shaped receiving portion.

5. In a method of assembling a fluid coupling device of the type including a first rotatable member defining an axis of rotation, cover means associated with the first member to define a fluid chamber therebetween, a valve plate disposed to separate the fluid chamber into a fluid operating chamber and a fluid reservoir chamber, a second rotatable member disposed in the fluid operating chamber and rotatable relative to the first member, valve means operable to control fluid communication between the operating chamber and the reservoir chamber and including a valve shaft disposed generally axially and extending outwardly through the cover means, a bimetal element having a first end portion operatively connected to the valve shaft and a second end portion, and a clip member operable to maintain the second end portion of the bimetal element substantially fixed relative to the cover means, the improvement comprising:
   (a) providing a clip member having a portion adapted to receive said second end portion of said bimetal element and first and second wing portions oppositely disposed about said receiving portion and oriented generally parallel to the adjacent surface portion of said cover means;

(b) assembling said clip member and said bimetal element with said second end portion disposed within said receiving portion;

(c) permitting said assembly of said second end portion of said bimetal element and said clip member to achieve a neutral position in both the radial and the circumferential directions; and (d) fixedly attaching each of said first and second wing portions to the adjacent portion of said cover means without causing substantial radial or circumferential movement of said second end portion during said attaching step.

6. A method of assembling a cover subassembly for use with a fluid coupling device of the type including an output coupling member defining an axis of rotation, a cover member associated with the output coupling member to define a fluid chamber therebetween, a valve plate disposed to separate the fluid chamber into a fluid operating chamber and a fluid reservoir chamber, an input coupling member disposed in the fluid operating chamber and rotatable relative to the output member, valve means operable to control fluid communication between the fluid operating chamber and the fluid reservoir chamber and including a valve shaft disposed generally axially and extending outwardly through the cover member, a bimetal coil having a first end operatively connected to the valve shaft and a second end oriented generally radially relative to the axis of rotation, and a clip member operable to maintain the second end of the bimetal coil substantially fixed relative to the cover member, the clip member having a portion adapted to receive the second end of the bimetal coil and first and second wing portions oppositely disposed about said receiving portion and oriented generally parallel to the adjacent surface portion of the cover member, the method comprising:

(a) assembling the valve shaft and the cover member;

(b) assembling the first end of the bimetal coil and the valve shaft;

(c) assembling the clip member and the bimetal coil with the second end disposed within the receiving portion;

(d) subsequent to steps (a)–(c), permitting the second end of the bimetal coil to achieve a neutral position in both the radial and the circumferential directions; and (e) subsequent to step (d), fixedly attaching each of the first and second wing portions to the adjacent portion of the cover member without permitting substantial radial or circumferential movement of the second end during the attaching step.

7. A method as claimed in claim 5 or 6 wherein said step of attaching includes moving each of said first and second wing portions into engagement with the adjacent portion of said cover means.

8. A method as claimed in claim 5 or 6 wherein said step of attaching comprises simultaneously welding each of said wing portions to said cover means.

* * * * *